United States Patent [19]

Reinhardt et al.

[11] 4,220,750

[45] Sep. 2, 1980

[54] THERMALLY STABLE AROMATIC ENYNE POLYIMIDES

[75] Inventors: Bruce A. Reinhardt, New Carlisle; Fred E. Arnold, Centerville, both of Ohio

[73] Assignee: The United States of America as represented by the Secretary of the Air Force, Washington, D.C.

[21] Appl. No.: 32,809

[22] Filed: Apr. 24, 1979

[51] Int. Cl.$^2$ ..................... C08G 73/10; C08G 73/12
[52] U.S. Cl. .................................. 528/172; 528/125; 528/128; 528/185; 528/188; 528/189; 528/226; 528/228; 528/229; 528/352; 528/353
[58] Field of Search ............... 528/128, 172, 185, 188, 528/189, 226, 228, 229, 352, 353, 125

[56] References Cited

U.S. PATENT DOCUMENTS

| | | | |
|---|---|---|---|
| 3,879,349 | 4/1975 | Bilow et al. | 528/188 |
| 3,926,913 | 12/1975 | Jones et al. | 528/353 |
| 3,987,003 | 10/1976 | Loughran et al. | 528/188 |
| 4,045,409 | 8/1977 | Arnold et al. | 528/172 |
| 4,075,171 | 2/1978 | D'Alelio | 528/188 |

*Primary Examiner*—Lester L. Lee
*Attorney, Agent, or Firm*—Joseph E. Rusz; Cedric H. Kuhn

[57] ABSTRACT

High molecular weight aromatic enyne polyimide thermoplastics are prepared by reacting an aromatic dianhydride with (E)-3,3'-(1-buten-3-ynylene) dianiline alone or in admixture with an aromatic diamine. Because of the presence of the enyne moiety in the polymer backbone, the polymers can be lightly crosslinked to provide solvent-resistant thermoplastics. The polymers are particularly useful in fabricating graphite-reinforced, thermoplastic composites for structural applications.

7 Claims, No Drawings

THERMALLY STABLE AROMATIC ENYNE POLYIMIDES

RIGHTS OF THE GOVERNMENT

The invention described herein may be manufactured and used by or for the Government of the United States for all governmental purposes without the payment of any royalty.

FIELD OF THE INVENTION

This invention relates to high molecular weight enyne polyimide thermoplastic polymers. In one aspect it relates to a process for preparing the thermoplastic polymers.

BACKGROUND OF THE INVENTION

In recent years there has been an increase in interest in the utilization of thermoplastics in fabricating fiber-reinforced composites. Thermoplastic matrices offer the possibility of reducing the fabrication costs of advanced structures. The cost reductions are possible because faster and less expensive manufacturing procedures can be followed as compared to those employed with conventional resin matrices.

A problem associated with thermoplastic composites relates to the high temperatures that are required. Temperatures in excess of 200°-300° F. above the glass transition temperature (Tg) of the thermoplastic material are usually necessary to sufficiently decrease the bulk viscosity for the thermoforming process. The problem becomes more critical as the use temperature of the structural composite is extended since higher use temperatures require thermoplastics with higher glass transition temperatures and consequently higher fabrication temperatures. The disadvantages of using very high processing temperatures (800°-1000° F.) include the unfavorable economics of high temperature tooling and the danger of thermal degradation of the polymer during fabrication.

The use of thermoplastic resins as structural material in aircraft has also been limited because of problems associated with linear polymeric systems. Linear polymers have very low solvent, creep and craze resistance. Solvents normally found on aircraft or air fields, such as hydraulic fluids, brake fluids, paint strippers, and the like, are potential hazards to such systems.

From the foregoing, it is seen that the ideal thermoplastic should meet certain requirements. Thus, the material should be one having a low glass transition temperature for favorable processing, and during fabrication its glass transition temperature should increase so as to extend its use temperature. The thermoplastic material should also have the capability to become lightly crosslinked when thermally treated during fabrication so as to diminish the various solvent induced problems inherent in linear polymeric materials.

It is a principal object of this invention to provide high molecular weight thermoplastic material with a glass transition temperature that advances on thermal treatment.

A further object of this invention is to provide thermoplastic materials which lightly crosslink on thermal treatment.

Other objects and advantages of the invention will become apparent to those skilled in the art upon consideration of the accompanying disclosure.

SUMMARY OF THE INVENTION

The present invention resides in high molecular weight enyne polyimides which on thermal or radiation treatment crosslink by addition reactions. The polyimides can be represented by the following structural formula:

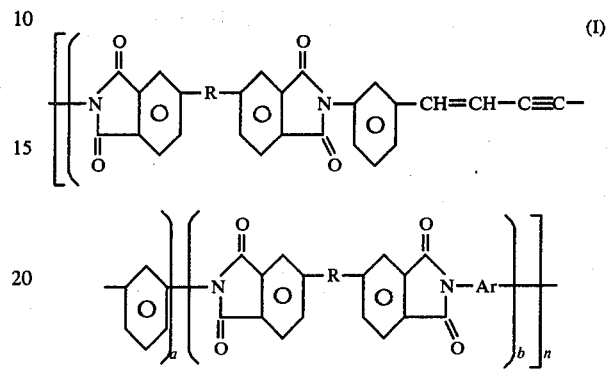

wherein Ar is a divalent aromatic radical; R is sulfur, sulfonyl, carbonyl or a divalent aromatic, aliphatic or perfluoroaliphatic radical; a is equal to 0.05 to 1, b is equal to zero to 0.95 and the sum of a and b is equal to 1; and n is an integer ranging from 1 to 100. The value of n is usually such that the polymer has an intrinsic viscosity of about 0.10 to 1.5 as determined in N,N-dimethylacetamide at 30° C.

Examples of divalent aromatic radicals (Ar) include the following:

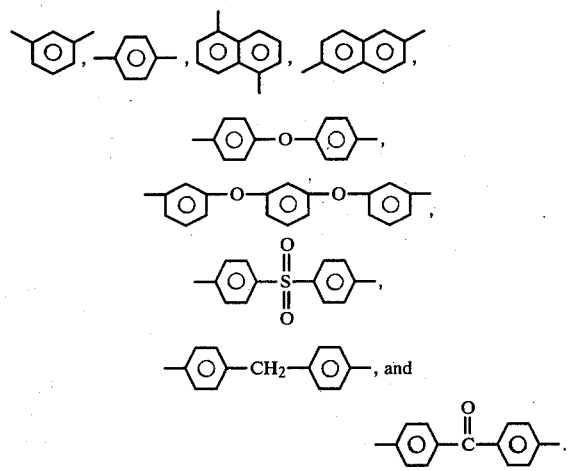

Examples of the R groups include the foregoing divalent aromatic radicals,

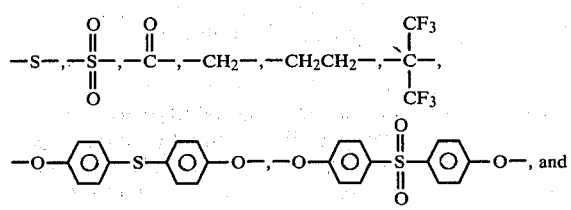

-continued

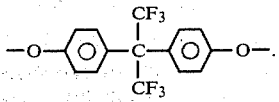

In one embodiment, the present invention resides in the process for preparing the above-defined enyne polyimides. The reactions involved in carrying out the process is shown by the equations set forth below.

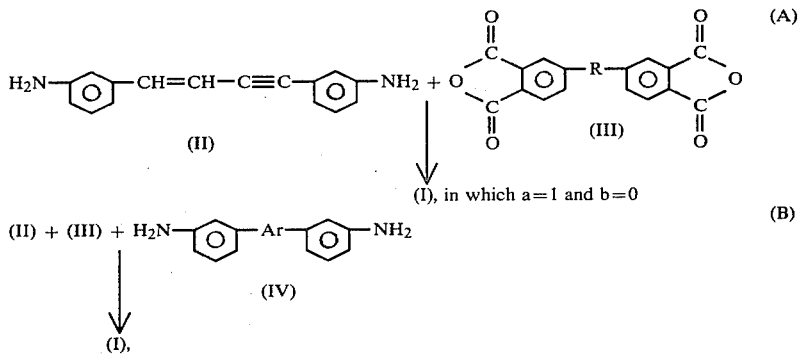

in which a and b are each less than 1 but greater than zero and the sum of a and b equals 1.

As seen from equation A, when it is desired to prepare an enyne polyimide according to formula I in which a equals 1 and b equals zero, (E)-3,3'-(1,buten-3-ynylene) dianiline (II) is reacted with the aromatic dianhydride (III). The condensation reaction is carried out under an inert atmosphere in a solvent in the presence of a catalytic amount of isoquinoline. Any suitable inert gas, such as nitrogen, helium or argon, can be utilized. As a solvent, it is usually preferred to use m-cresol. Usually, a material, such as toluene, that forms an azeotrope with water is added to the reaction mixture. Anhydrous conditions important to the conduct of the process are thereby maintained. The reaction is generally conducted at a temperature ranging from about 150° to 300° C. for a period of about 1.5 to 5 hours. Although a slight excess of one of the monomers can be employed, the monomers are preferably used in equimolar amounts. At the end of the reaction period, the product is recovered from the reaction mixture. Recovery of the product is conveniently accomplished by cooling the mixture to about room temperature and then pouring it into a non-solvent, such as methanol, thereby causing the polyimide to precipitate from solution.

When it is desired to prepare a copolymer according to formula I in which a and b are each less than 1 but greater than zero and their sum equals 1, the reaction involved is shown by the equation B above. As indicated by equation B, a mixture of diamines (II) and (IV) is reacted with the aromatic dianhydride (III). The reaction depicted by equation B is conducted in essentially the same manner as that described above with relation to equation A. As in the case of preparing the homopolymer, it is preferred to use equimolar amounts of the aromatic dianhydride (III) and the mixture of diamines (II and IV).

Because of the presence of an additional reactant, namely, aromatic diamine (IV), product (I) contains in its structure a divalent aromatic radical (Ar). The amount of these groups present in the structure is dependent upon the mole ratio of compounds II and IV contained in the reaction mixture used in the reaction shown by equation B. For example, if the mole ratio of compound II to compound IV is 1:3, then a is equal to 0.25 and b is equal to 0.75. Or if the mole ratio of compound II to compound IV equals 1, then a and b are each equal to 0.5

The diamine (E)-3,3'-(1-buten-3-ynylene) dianiline (II) is prepared by the procedure described in Example I of commonly assigned, copending U.S. application Ser. No. 946,290, filed on Sept. 27, 1978 and issued on July 24, 1979, as U.S. Pat. No. 4,162,265. The compound is named therein as 1,4-bis(3-aminophenyl)buta-1-ene-3-yne rather than by the nomenclature used herein, but it is the same compound. The disclosure of Ser. No. 946,290 is incorporated herein by reference.

The aromatic dianhydrides and aromatic diamines employed with (E)-3,3'-(1-buten-3-ynylene)dianiline in synthesizing the polyimides of this invention are well known compounds that are described in the literature. Examples of aromatic dianhydrides (III) that can be used include bis(3,4-dicarboxyphenyl)methane dianhydride, bis(3,4-dicarboxyphenyl)ether dianhydride, 3,3',4,4'-benzophenonetetracarboxylic acid dianhydride, 2,2-bis(3,4-dicarboxyphenyl)hexafluoropropane dianhydride, 1,4-bis(3,4-dicarboxyphenoxy)-diphenylsulfonyl dianhydride, 1,4-bis(3,4-dicarboxyphenoxy)-diphenylsulfide dianhydride, and 2,2-bis[4-(3,4-dicarboxyphenoxy)phenyl]-hexafluoropropane dianhydride. Examples of aromatic diamines (IV) that can be used include 4,4'-diaminodiphenylsulfone, 4,4'-biaminodiphenylsulfate, 4,4'-diaminobenzophenone, m-phenylenediamine, p-phenylenediamine, 1,5-diaminonaphthalene, 2,6-diaminonaphthalene, 4,4'-diaminodiphenylether, and 1,3-bis-aminophenoxybenzene.

Curing of the polyimides is readily accomplished by heating the materials in an inert or oxidative atmosphere at a temperature ranging from about 250° to 370° C. A heating period of from 1 to 6 hours is usually sufficient to obtain a complete cure although longer times, e.g., up to 24 hours, can be used. While it is not intended to limit the invention to any particular theory, the curing operation is believed to encompass the interchain dimerization of the enyne structure to form cyclooctatetraene.

A more comprehensive understanding of the invention can be obtained by referring to the following illustrative examples which are not intended, however, to be unduly limitative of the invention.

EXAMPLE I

Poly[[(E)-(1,3-dioxo-2,5-isoindolinediyl)[oxy-1,4-phenylene-2,2,2-trifluoro-1-(trifluoromethyl)ethylidene]-1,4-phenyleneoxy-(1,3-dioxo-5,2-isoindolinediyl)-1,3-phenylene-1-buten-3-ynylene-1,3-phenylene]]

a=1, b=0

In a dry, 25 ml, 3 necked flask equipped with a magnetic stirring bar, a nitrogen inlet, a short-path distillation apparatus, and a stopper was placed 0.3999 g (1.707 mmol) of (E)-3,3'-(1-buten-3-ynylene)dianiline, 4 ml of freshly distilled m-cresol, and 2 drops of isoquinoline. After the diamine had dissolved, 1.0727 g (1.707 mmol) of 2,2-bis[4-(3,4-dicarboxyphenoxy)phenyl]-hexafluoropropane dianhydride was added in several portions over a period of 30 minutes. The final portion of dianhydride was washed in with 4 ml of m-cresol and 5 ml of toluene. The reaction mixture was heated slowly to 80° C. during which time all solids went into solution. The temperature of the reaction mixture was raised to 140° C. at which time the toluene began to distill. After approximately 4 ml of toluene had been distilled, 5 additional ml of toluene were added and the temperature raised slowly to 165° C. during which time almost all the remaining toluene distilled. The temperature was maintained at 165° C. for 1½ hours during which time the reaction mixture became very viscous. The reaction mixture was then cooled, diluted with 15 ml of chloroform and precipitated into 1200 ml of rapidly stirring methanol. The resulting white polymer was filtered, air dried and reprecipitated from chloroform-methanol. After drying at 130° C. (0.4 mm Hg) for 18 hours the polymer had an intrinsic viscosity of 0.51 in dimethylacetamide (DmAc) at 30° C.

Analysis Calc'd. for $C_{47}H_{24}N_2O_6F_6$: C, 68.78; H, 2.93; N, 3.39. Found: C, 67.91; H, 2.57; N, 3.23.

EXAMPLE II

Poly[[(E)-(1,3-dioxo-2,5-isoindolinediyl)[oxy-1,4-phenylenesulfonyl-1,4-phenyleneoxy]-(1,3-dioxo-5,2-isoindolinediyl)-1,3-phenylene-1-buten-3-ynylene-1,3-phenylene]]

a=1, b=0

In a 25 ml, 3 necked reaction flask, equipped with a short path distillation apparatus, a magnetic stirring bar, a nitrogen inlet, and a stopper was placed 0.3999 g (1.707 mmol) of (E)-3,3'-(1-buten-3-ynylene) dianiline, 4 ml of m-cresol and 2 drops of isoquinoline. After the diamine had dissolved, 0.9260 g (1.707 mmol) of 1,4-bis(3,4-dicarboxyphenoxy)diphenylsulfonyl dianhydride was added in portions over a period of 30 minutes. The final portion of dianhydride was washed in with 4 ml m-cresol and 5 ml of toluene. The reaction mixture was heated slowly to 80° C. during which time all the suspended solids dissolved. The temperature was raised to 140° C. at which time toluene began to distill. After approximately 4 ml of toluene were removed, 5 additional ml of toluene were added and the temperature raised slowly to 165° C. during which time almost all the remaining toluene distilled. The temperature was held at 165° C. for two hours and then raised to 175° C. for 1 hour. The reaction mixture was cooled, diluted with 5 ml of dimethylformamide (DMF) and precipitated into 1200 ml of rapidly stirring methanol. The white fibrous polymer was filtered, air dried, and reprecipitated from DMF-methanol. After drying at 120° C. (0.4 mm Hg) for 18 hours, the polymer had an intrinsic viscosity at 30° C. of 0.35 in DmAc.

Analysis Calc'd. for $C_{44}H_{24}N_2SO_8$: C, 71.34; H, 3.27; N, 3.78. Found: C, 71.24; H, 3.19; N, 3.54.

EXAMPLE III

Poly[[(E)-(1,3-dioxo-2,5-isoindolinediyl)[2,2,2-trifluoro-1-(trifluoromethyl)ethylidene](1,3-dioxo-5,2-isoindolinediyl)-1,3-phenylene-1-buten-3-ynylene-1,3-phenylene]]

a=1, b=0

In a dry, 25 ml, 3 necked flask, equipped with a magnetic stirring bar, a nitrogen inlet, a short-path distillation apparatus, and a stopper was placed 0.3999 g (1.707 mmol) of (E)-3,3'-(1-buten-3-ynylene) dianiline, 4 ml of freshly distilled m-cresol and 2 drops of isoquinoline. After the diamine had dissolved, 0.7583 g (1.707 mmol) of 2,2-bis(3,4-dicarboxyphenyl) hexafluoropropane dianhydride was added in several portions over a period of 30 minutes. The final portion of dianhydride was washed in with 4 ml m-cresol and 5-ml of toluene. The mixture was heated slowly to 80° C. during which time all the solids dissolved. The stopper was replaced with an addition funnel and the temperature of the reaction mixture raised to 140° C. at which time the toluene began to distill. After approximately 4 ml of toluene were distilled, 8 additional ml of toluene were added and the temperature raised slowly to 165° C. during which time almost all the remaining toluene distilled. The temperature was held at 165° C. for two hours. The reaction mixture was cooled, diluted with 10 ml of chloroform and precipitated into 1200 ml of rapidly stirring methanol. The white fibrous polymer was filtered, air dried and reprecipitated from chloroform-methanol. After drying at 120° C. (0.4 mm Hg) overnight, the polymer had an intrinsic viscosity at 30° C. of 0.45 in DmAc.

Analysis Calc'd for $C_{35}H_{16}N_2O_4F_6$: C, 65.42; H, 2.51; N, 4.36. Found: C, 65.61; H, 2.15; N, 4.54.

EXAMPLE IV

Poly[[(E)-(1,3-dioxo-2,5-isoindolinediyl)[2,2,2-trifluoro-1-(trifluoromethyl)ethylidene](1,3-dioxo-5,2-isoindolinediyl)-1,3phenylene-1-buten-3-ynylene-1,3-phenylene]-co-[(1,3-dioxo-2,5-isoindolinediyl)[2,2,2-trifluoro-1-(trifluoromethyl)ethylidene]-(1,3-dioxo-5,2-isoindolinediyl)-1,3-phenyleneoxy-1,3-phenyleneoxy-1,3-phenylene]]

a=0.25, b=0.75

In a dry, 25 ml, 3 necked flask, equipped with a magnetic stirring bar, a nitrogen inlet, a short-path distillation apparatus, and a stopper was placed 0.1000 g (0.427 mmol) of (E)-3,3'-(1-buten-3-ynylene) dianiline, 0.3742 g (1.2802 mmol) of 1,3-bis-aminophenoxybenzene, 6 ml of freshly distilled m-cresol and 2 drops of isoquinoline. After both diamines had dissolved, 0.7583 g (1.707 mmol) of 2,2-bis(3,4-dicarboxyphenyl)hexafluoropropane dianhydride was added in several portions over a period of 30 minutes. The final portion of dianhydride was washed in with 4 ml of m-cresol and 5 ml of toluene. The mixture was heated slowly to 80° C. during which time all solids dissolved. The stopper was replaced with an addition funnel and the temperature of the reaction mixture raised to 140° C. at which time the toluene began to distill. After approximately 4 ml of toluene were distilled, 5 additional ml of toluene were added and the temperature raised slowly to 175° C. during which time almost all the remaining toluene distilled. The temperature was held at 175° C. for two hours. The reaction mixture was cooled, diluted with 10 ml of chloroform and precipitated into 1200 ml of rapidly stirring methanol. The white fibrous polymer was filtered, air dried and reprecipitated from chloroform-methanol. After drying at 130° C. (0.4 mm Hg) for 18 hours, the polymer had an intrinsic viscosity at 30° C. of 0.42 in DmAc.

Analysis Calc'd for $(C_{72}H_{34}N_4O_{10}F_{12})_n$: C, 63.87; H, 2.57; N, 4.08. Found: C, 63.53; H, 2.43; N, 3.78.

EXAMPLE V

Poly[[(E)-(1,3-dioxo-2,5-isoindolinediyl)[2,2,2-trifluoro-1-(trifluoromethyl)ethylidene](1,3-dioxo-5,2-isoindolinediyl)-1,3-phenylene-1-buten-3-ynylene-1,3-phenylene]-co-[(1,3-dioxo-2,5-isoindolinediyl)[2,2,2-trifluoro-1-(trifluoromethyl)ethylidene]-(1,3-dioxo-5,2-isoindolinediyl)-1,3-phenyleneoxy-1,3-phenyleneoxy-1,3-phenylene]]

a=0.5, b=0.5

In a dry, 25 ml, 3 necked flask, equipped with a magnetic stirring bar, a short path distillation apparatus, a nitrogen inlet, and a stopper was placed 0.2000 g (0.8535 mmol) of (E)-3,3-(1-buten-3-ynylene) dianiline, 0.2495 g (0.8534 mmol) of 1,3-bis-aminophenoxybenzene, 6 ml of m-cresol and 2 drops of isoquinoline. After both diamines had dissolved, 0.7853 g (1.707 mmol) of 2,2-bis(3,4-dicarboxyphenyl) hexafluoropropane dianhydride was added in several portions over a period of 30 minutes. The final portion of dianhydride was washed in with 4 ml of m-cresol and 5 ml of toluene. The mixture was heated slowly to 80° C. during which time all the solids dissolved. The temperature of the reaction mixture was raised to 140° C. at which time the toluene began to distill. After approximately 4 ml of toluene were distilled, 8 additional ml of toluene were added and the temperature raised slowly to 175° C. during which time almost all the remaining toluene distilled. The temperature was held at 180° C. for two hours. The reaction mixture was cooled, diluted with 12 ml of chloroform and precipitated into 1200 ml of rapidly stirring methanol. The white fibrous polymer was filtered, air dried and reprecipitated from chloroform-methanol. After drying at 120° C. (0.4 mm Hg) overnight, the polymer had an intrinsic viscosity at 30° C. of 0.70 in DmAc.

Analysis Calc'd for $(C_{72}H_{34}N_4O_{10}F_{12})_n$: C, 64.34; H, 2.55; N, 4.16. Found: C, 64.21; H, 2.21; N, 4.58.

EXAMPLE VI

Samples of neat polymer prepared in Examples I-V were cast from chloroform into 1 mil film specimens. The glass transition temperatures of the films were determined by differential scanning calorimetry at 20° C./min. The data obtained are shown hereinafter in the table. The film specimens were then placed in a preheated oven at 343° C. (650° F.) and removed and allowed to cool to room temperature. The glass transition temperatures of the cured polymers were then redetermined as above. The results are shown in the table.

After cure, the film specimens were completely insoluble in the casting solvent as well as in all other solvents tested. Film specimens could also be rendered insoluble by exposing them to uv radiation or sunlight for 1 to 2 hours.

TABLE

| Polymer of Example | R[1] | Ar[1] | Value of (a) in Formula I | Value of (b) in Formula I | Tg, °C. Before Cure | Tg, °C. After Cure |
|---|---|---|---|---|---|---|
| I | —O—⟨O⟩—C(CF$_3$)(CF$_3$)—⟨O⟩—O— | — | 1 | 0 | 212 | 245 |
| II | —O—⟨O⟩—S(=O)(=O)—⟨O⟩—O— | — | 1 | 0 | 243 | 325 |
| III | —C(CF$_3$)(CF$_3$)— | — | 1 | 0 | 265 | 315 |
| IV | —C(CF$_3$)(CF$_3$)— | —⟨O⟩—O—⟨O⟩—O—⟨O⟩— | 0.25 | 0.75 | 208 | 227 |
| V | —C(CF$_3$)(CF$_3$)— | —⟨O⟩—O—⟨O⟩—O—⟨O⟩— | 0.5 | 0.5 | 222 | 272 |

[1]R and Ar radicals in Formula (I).

As seen from the data in the foregoing table, the glass transition temperatures of the enyne polyimide thermoplastics increase as a result of thermal treatment (curing). Thus, lower Tg's are provided for fabrication while after curing the Tg's increase to give high use temperatures. The enyne polyimides become lightly crosslinked during curing, thereby rendering the polymers solvent resistant. Because of their outstanding properties, the thermoplastic polymers of this invention are eminently suitable for use in the fabrication of fiber-reinforced composites.

As will be evident to those skilled in the art, modifications of the present invention can be made in view of the foregoing disclosure without departing from the spirit and scope of the invention.

We claim:

1. An aromatic enyne polyimide consisting essentially of recurring units having the following structural formula:

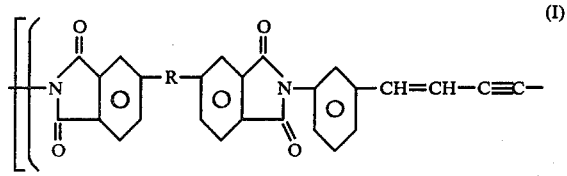
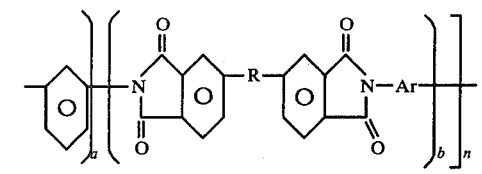
(I)

wherein Ar is a divalent aromatic radical; R is sulfur, sulfonyl, carbonyl or a divalent aromatic, aliphatic or perfluoroaliphatic radical; a is equal to 0.05 to 1, b is equal to zero to 0.95 and the sum of a and b is equal to 1; and n is an integer ranging from about 1 to 100.

2. The aromatic enyne polyimide according to claim 1 in which Ar is a divalent aromatic radical selected from the group consisting of

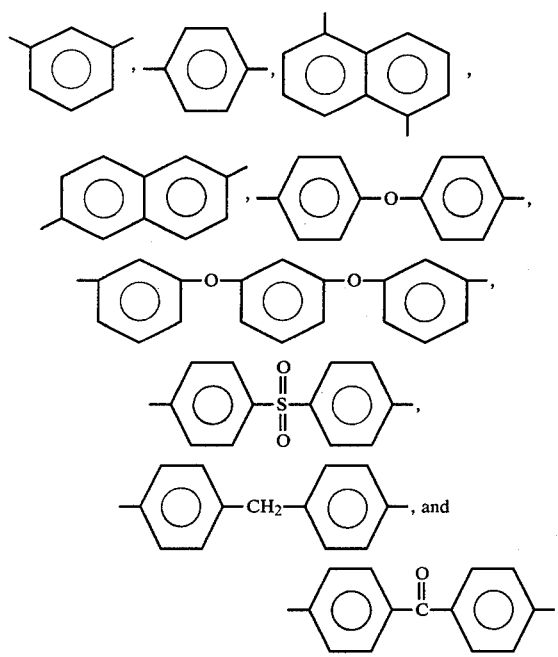

and R is a radical selected from the group consisting of the foregoing divalent aromatic radicals,

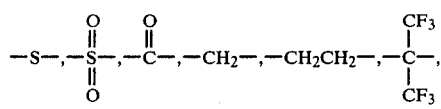

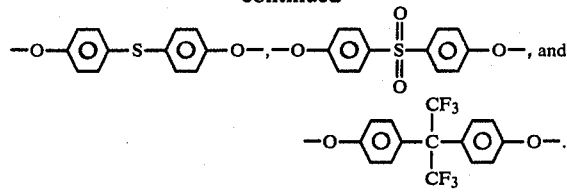

3. The aromatic enyne polyimide according to claim 2 in which R is

a is 1 and b is zero.

4. The aromatic enyne polyimide according to claim 2 in which R is

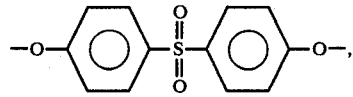

a is 1 and b is zero.

5. The aromatic enyne polyimide according to claim 2 in which R is

a is 1 and b is zero.

6. The aromatic enyne polyimide according to claim 2 in which R is

Ar is

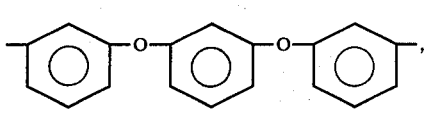

a is equal to 0.25 and b is equal to 0.75.

7. The aromatic enyne polyimide according to claim 2 in which R is

Ar is

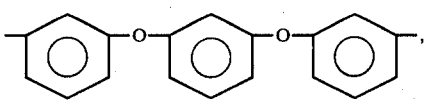

a is equal to 0.5 and b is equal to 0.5.

* * * * *